United States Patent [19]

Lindqvist

[11] 4,316,507
[45] Feb. 23, 1982

[54] REVERSIBLE PLOW

[75] Inventor: Rolf E. Lindqvist, Linköping, Sweden

[73] Assignee: Aktiebolaget Overums Bruk, Overum, Sweden

[21] Appl. No.: 143,330

[22] Filed: Apr. 24, 1980

[30] Foreign Application Priority Data

Apr. 26, 1979 [SE] Sweden .............................. 7903661

[51] Int. Cl.³ .............................................. A01B 3/34
[52] U.S. Cl. .................................................. 172/225
[58] Field of Search .............. 172/225, 224; 91/375 R

[56] References Cited

U.S. PATENT DOCUMENTS 4,154,306 5/1979 Hawes .................................. 172/225

FOREIGN PATENT DOCUMENTS 1190530 5/1970 United Kingdom ................. 172/225

Primary Examiner—George J. Marlo
Attorney, Agent, or Firm—Alfred E. Miller

[57] ABSTRACT

A frame of a reversible plow having plow shares that are directed to the right and to the left. The frame is turned by means of a piston connected to a turning shaft of the frame, the turning of the cylinder being controlled by an automatic reversing valve. The valve has a fixed housing and a movable shaft. Peripheral grooves are present in either the housing or shaft through which hydraulic oil is supplied from one side of the piston to the other side thereof.

7 Claims, 10 Drawing Figures

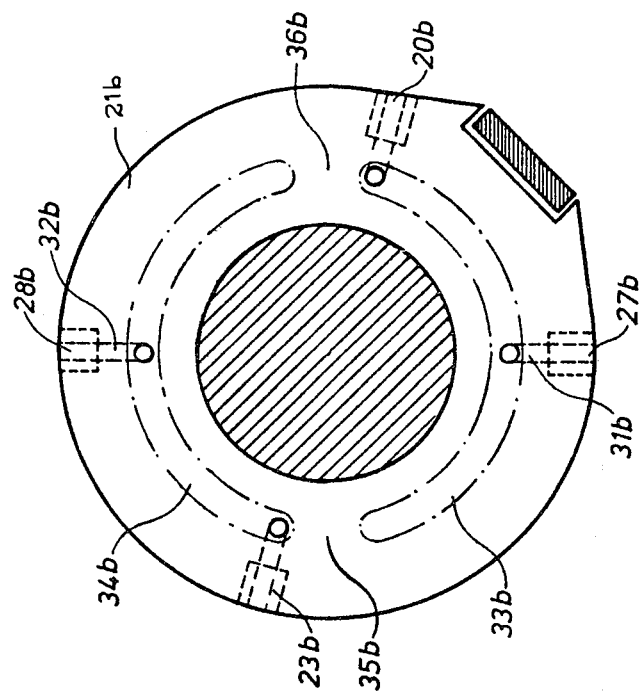
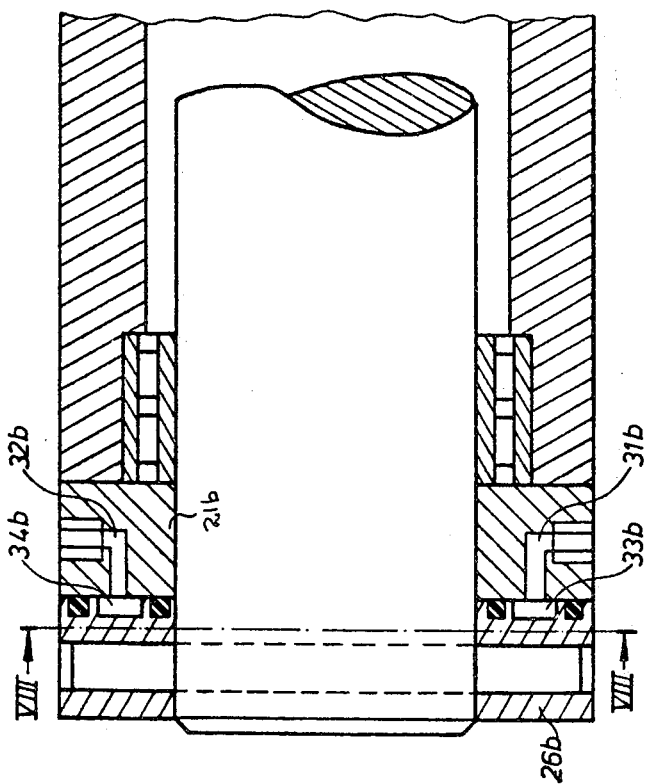
Fig. 8
Fig. 7

REVERSIBLE PLOW

The present invention relates to a device for use with a reversible plow which comprises a frame having plow shares that are directed to the left and to the right, the frame being designed to be rotated in a support part through about 180° about a horizontal axis extending in the direction of movement of the plow. The frame is rotated by means of a hydraulic cylinder, which is swingably supported in the support part and whose piston and piston shaft make a forwards and backwards movement during said rotation.

Devices of the above type are previously known. However, the known devices have the disadvantage that they are very complicated since they include a plurality of coacting parts, such as differential pistons, check valves, etc.

It is also known to use a reversing valve in which the upper part of the cylinder is a moving part of the valve, whereas a shaft on the support part is a rigid part coacting with the moving part. When the cylinder is activated it is turned and this movement is used to reverse the driving direction of the piston. However, this device has the following disadvantages: the device does not permit a slow process to take place because of the small turning angle, which in turn means that the plow and turning shaft will be subject to great stresses during the turning movement. The fluid process in the cylinder is also such that the channels in the valve have their greatest area at the beginning and at the end of the movement, which accentuates the stresses at the end positions even more. Moreover, the locking effect in the end positions is not reliable because this type of valve has a large amount of inner leakage.

It is a feature of the present invention to provide a valve in which the above drawbacks are eliminated and which is constructed with a few sturdy components, and has a reliable function and a low price, and additionally provides an effective locking function in the end positions. This is achieved by a device according to the invention, and as defined in the following claims.

In order that the invention will be more clearly understood, it will now be disclosed in greater detail with reference to the accompanying drawings, in which:

FIGS. 1-3 are partial sectional and partial elevational views of the device of the invention at different turning angles of the frame, in which FIG. 1 shows the starting position, FIG. 2 shows the turning position and FIG. 3 shows the end position.

Figure 10:
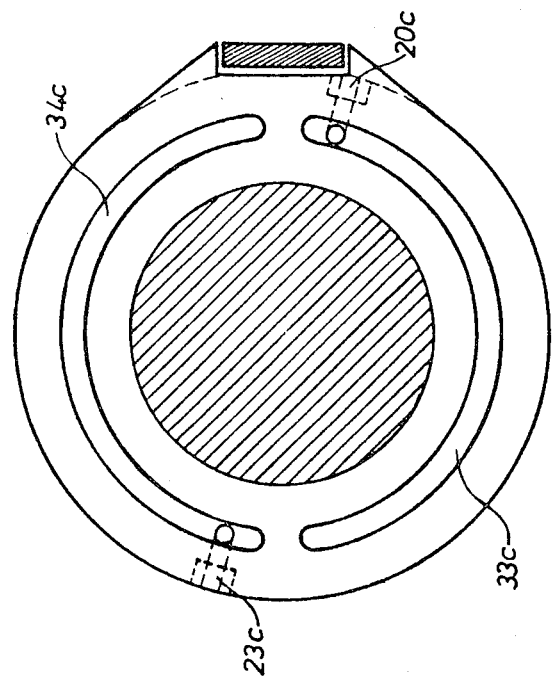
Figure 9:
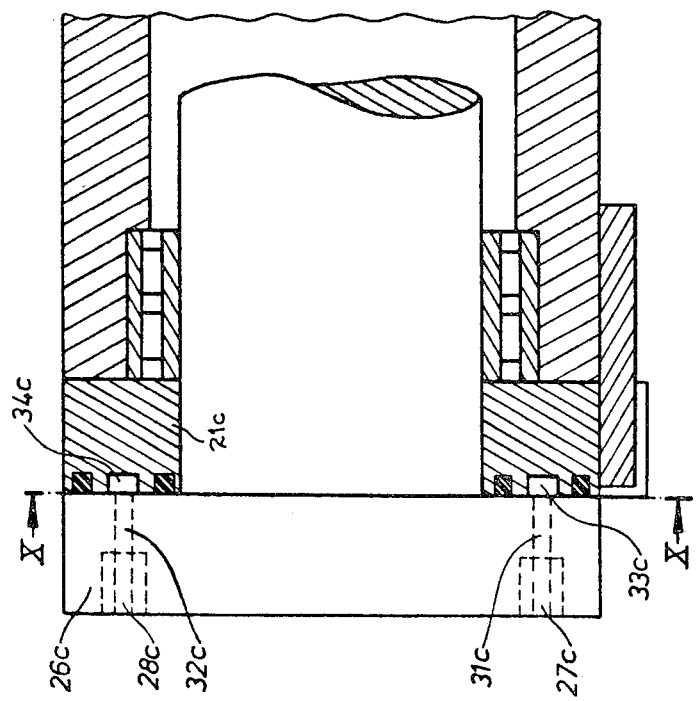

FIGS. 7-10 are further embodiments of the invention with FIGS. 7 and 9 being vertical sections through the device, and FIGS. 8 and 10 are sections taken along the lines VIII—VIII and X—X respectively of FIGS. 7 and 9.

Figure 3:
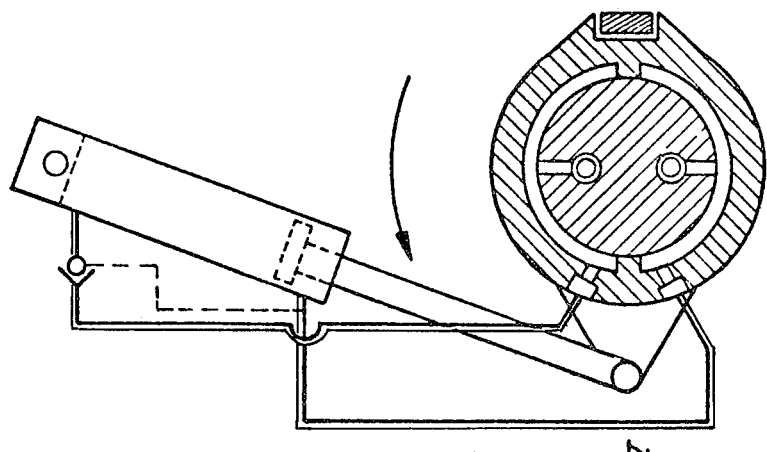
Figure 4:
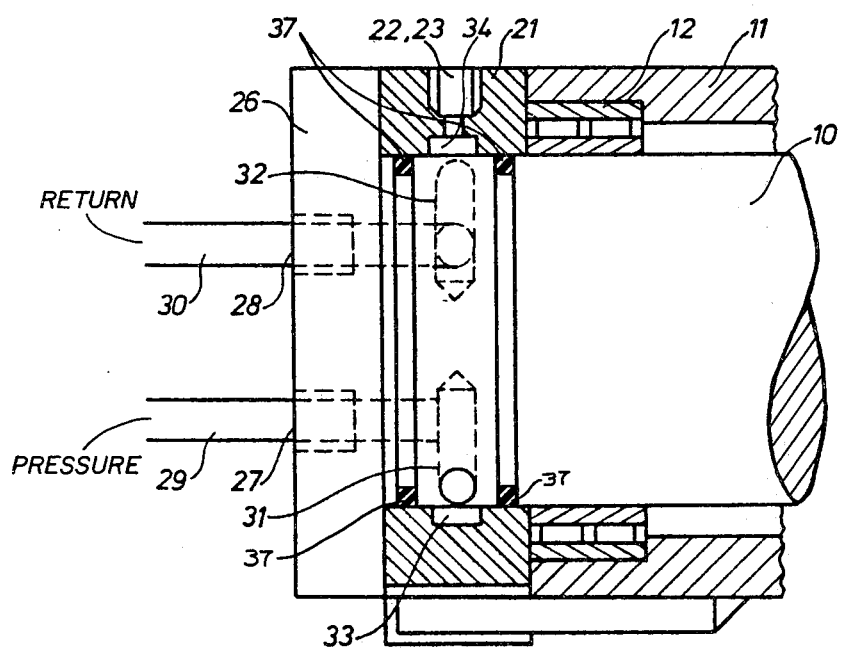
FIG. 4 is a sectional view on an enlarged scale taken along the line IV—IV of FIG. 2.

The device described in FIGS. 1-4 comprises a frame on which plow shares directed to the left and to the right are supported. The front end of the frame, as seen in the direction of movement, is provided with a shaft 10, which is surrounded by a housing 11 (FIG. 4). The housing 11 is the lower section of a support part, which is intended to be supported by and fastened to a towing vehicle. The shaft 10 is supported in the housing 11 by means of roller bearings 12, of which the one at the front of the device is shown in FIG. 4. The support part has in its upper portion a fastening portion 13 for a cylinder 14. The cylinder is journalled for turning movement in its upper part in the fastening portion 13, and has a piston rod 15 as well as a piston 16, the latter being adapted to reciprocate in the cylinder. The outer end of the piston rod 15 is pivotally connected to a lug 18 in a bearing portion 17, the lug being fixed to the shaft 10. One end of the piston communicates by means of a hose 19 with a first hole 20 in an annular middle part 21 connected to the housing 11 in a manner not shown. The other end of the piston communicates by means of a hose 22 with a second hole 23 in the middle part 21. The hose 22 is provided with a pressure controlled check valve 24 which normally prevents return flow of hydraulic oil to the cylinder. However, the valve can be opened by means of oil in a pressure conduit 25 which communicates at one end with the hose 19.

The shaft 10, at its outer end, is rigidly connected to an end wall 26 having two through holes 27 and 28. These holes are connected to the hydraulic system of the towing vehicle through a pressure conduit 29 and a return conduit 30, respectively. The holes 27 and 28 of the end wall 26 continue into channels 31 and 32 in the shaft 10. These channels open at each side of the periphery of the shaft. The middle part 21 of the housing 11 is provided with two grooves 33 and 34 on its inner surface. The grooves are long and extend around the periphery, and are aligned with each other. They are divided by walls 35 and 36. The groove 33 communicates with the first hole 20 and the groove 34 communicates with the second hole 23. Moreover, there are two annular seals 37 surrounding the shaft 10 at each side of the grooves 33 and 34.

The present device operates in the following manner with reference to FIGS. 1-3.

When the plow frame is to be turned from its left-hand position to its right-hand position and vice versa, an operating means in the hydraulic system of the towing vehicle is activated. Thus, pressure liquid is transmitted to the pressure conduit 29 and further through the hole 27, the channel 31, the groove 33, the first hole 20 and the hose 19 to the underside of the piston. At the same time pressure liquid flows into the pressure conduit 25, and this liquid activates the pressure controlled check valve 24 to open, and to thereby discharge the return oil above the piston 16 through the hose 22. This oil flows through the second hole 23 into the groove 34, and further out through the channel 32, the hole 28 and the return conduit 30 to the towing vehicle. The pressure oil entering under the piston causes the latter to be drawn into the cylinder, thus turning the shaft 10 by means of the lug 18. When the shaft has turned through about 90°, i.e. when it assumes the position shown in FIG. 2, the outlet of the channel 31 will pass one of the walls 36, whereas the outlet of the channel 32 passes the other wall 35. This causes the pressure oil from the towing vehicle now instead to pass the groove 34 and to continue through the second hole 23, the hose 22 and the check valve 24 into the cylinder above the piston 16 and to force the piston in a downward direction, the return oil being forced out through the hose 19, the first hole 20, the groove 33, the channel 32 and the return conduit 30. When the shaft has turned through more than 90°, it assumes its end position, and when the pressure from the hydraulic system of the towing vehicle then decreases, the shaft is locked in this position, since the check valve 24 prevents the flow of oil from the cylinder. During the above-described turning movement of the shaft, the cylinder makes a swinging movement about the fastening portion 13, and moves from the right to the left, as seen in FIGS. 1–3.

Figure 2:
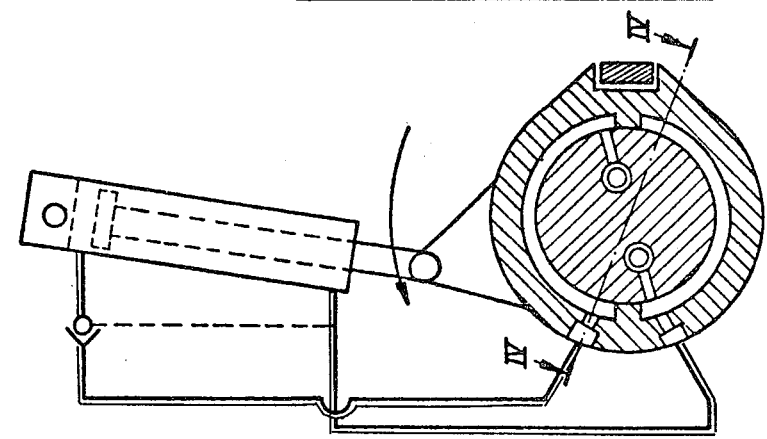
Figure 1:
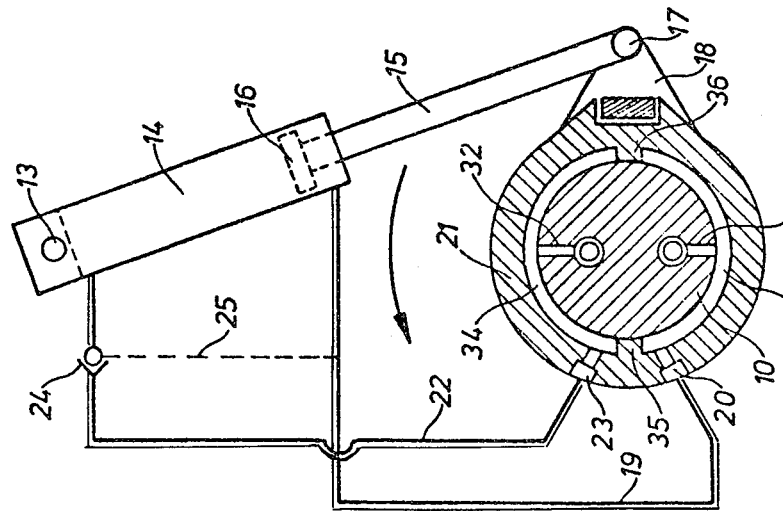
Figure 6:
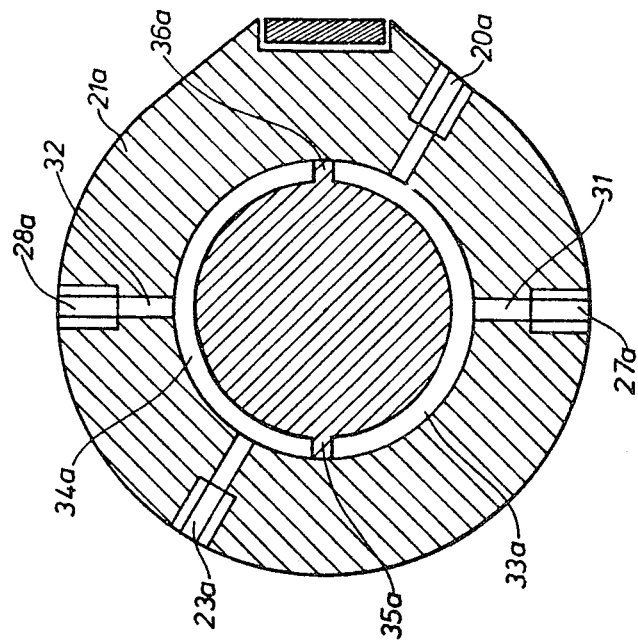
FIGS. 5 and 6 are sectional view of another embodiment of the invention, FIG. 5 being a vertical section through the device and FIG. 6 being a section taken along the line VI—VI of FIG. 5.
Figure 5:
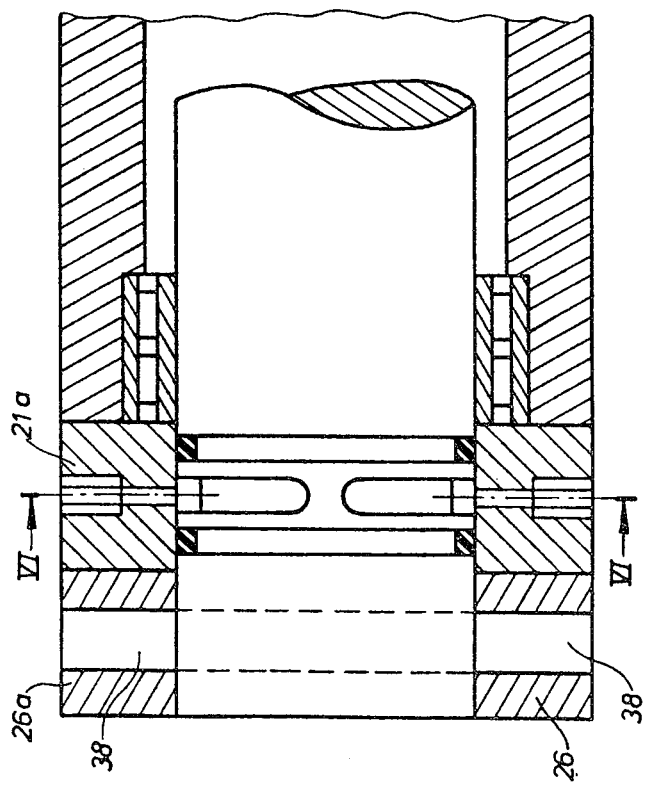

The embodiment of the invention shown in FIGS. 5 and 6 differs from the structures shown in FIGS. 1–3 in that the grooves 33a and 34a and the wall 35a and 36a, respectively, instead of being part of the middle part 21 are part of the shaft 10. The end wall 26a is fastened to the shaft 10 by means of a pin 38, and can be provided with a lug 18 for the piston rod 15. The advantage of this arrangement is that the hose connection and the hoses need not follow the turning movement of the shaft. Instead the holes 27a and 28a and the holes 20a and 23a are in the middle part 21, which is not movable.

The embodiment of the invention shown in FIGS. 7 and 8 has the same advantages as the embodiment described in connection with FIGS. 5 and 6, but differs from the two embodiments described above in that the grooves 33b and 34b, as well as the walls 35b and 36b, are instead placed in the end wall 26b, whereas the channels 31b and 32b, the holes 27b and 28b, and the holes 20b and 23b are in the middle part 21b.

In the embodiment of the invention shown in FIGS. 9 and 10, the end wall 26c, as shown in the embodiment of FIGS. 1–4, is connected to the shaft 10 and is provided with holes 27c and 28c, and provided with channels 31c and 32c, the hose connections from these holes following the shaft during its turning movement. In this embodiment the side of the middle part 21c which faces the end wall 26c is provided with grooves 33c and 34c and holes 20c and 23c.

It is to be understood that the present invention is, of course, not limited to the embodiments shown and described, but can be modified within the scope of the following claims.

What is claimed is:

1. In a reversible plow having a frame provided with plow shares directed to the left and to the right, said frame being mounted to turn in a support part through about 180° about a horizontal axis extending in the direction of movement of said plow, said turning being caused by a hydraulic cylinder that is swingably supported in a support part and having a piston that moves forward and backward in said cylinder during said turning action, the improvement comprising: a turning shaft on said frame, a reversing valve, said valve being combined with said shaft, the latter being part of said reversing valve controlling the flow of oil to said cylinder, and a housing surrounding said shaft and being connected to said support part and being a coacting part of said reversing valve.

2. A plow as claimed in claim 1 further comprising two hoses connecting said housing to said cylinder, one of said hoses being connected to one side of said piston and the other hose being connected to the other side of said piston, and a pressure controlled check valve functioning as a hydraulic lock which locks said frame in one of its two end positions.

3. A plow as claimed in claim 2 wherein said shaft is provided with two grooves extending through about 180° along a periphery thereof, and each of said grooves being connected to one of said hoses.

4. A plow as claimed in claim 2 wherein said housing is provided with two grooves extending through about 180° along a periphery thereof, and each of said grooves being connected to one of said hoses.

5. A plow as claimed in claim 1 further comprising two hoses connecting said shaft to said cylinder, one of said hoses being connected to one side of said piston and the other hose being connected to the other side of said piston, and a pressure controlled check valve functioning as a hydraulic lock which locks said frame in one of its two end positions.

6. A plow as claimed in claim 1 adapted to be attached to a towing vehicle having a hydraulic system comprising a pressure conduit and a return conduit, and said housing is connected to said hydraulic system of the towing vehicle by means of said pressure conduit and return conduit, respectively.

7. A plow as claimed in claim 1 adapted to be attached to a towing vehicle having a hydraulic system comprising a pressure conduit and a return conduit, and said shaft is connected to said hydraulic system of the towing vehicle by means of said pressure conduit and return conduit, respectively.

* * * * *